(12) United States Patent
Ravndal et al.

(10) Patent No.: US 10,481,297 B2
(45) Date of Patent: Nov. 19, 2019

(54) FLUID MIGRATION PATHWAY DETERMINATION

(71) Applicant: WESTERNGECO L.L.C., Houston, TX (US)

(72) Inventors: Oda Roaldsdotter Ravndal, Stavanger (NO); Jarle Haukås, Sola (NO); Bjørn Harald Fotland, Stavanger (NO); Lars Sønneland, Tananger (NO)

(73) Assignee: WESTERNGECO L.L.C. Houston, TX (US)

( * ) Notice: Subject to any disclaimer, the term of this patent is extended or adjusted under 35 U.S.C. 154(b) by 1063 days.

(21) Appl. No.: 13/752,160

(22) Filed: Jan. 28, 2013

(65) Prior Publication Data

US 2014/0214327 A1    Jul. 31, 2014

(51) Int. Cl.
*G01V 1/24* (2006.01)
*G01V 99/00* (2009.01)

(52) U.S. Cl.
CPC .................................. *G01V 99/005* (2013.01)

(58) Field of Classification Search
CPC .... G01V 1/288; G01V 1/302; G01V 2210/64; G01V 2210/667; G01V 1/345; G01V 1/24; G01V 99/005; G01V 2210/644
USPC ...................................................... 702/16, 14
See application file for complete search history.

(56) References Cited

U.S. PATENT DOCUMENTS

| | | | |
|---|---|---|---|
| 3,776,032 A | 12/1973 | Vogel | |
| 5,710,726 A | 1/1998 | Rowney et al. | |
| 6,574,563 B1 | 6/2003 | Nickel | |
| 6,694,264 B2 | 2/2004 | Grace | |
| 7,203,342 B2 | 4/2007 | Pedersen | |
| 7,248,539 B2 | 7/2007 | Borgos et al. | |
| 7,355,597 B2 | 4/2008 | Laidlaw et al. | |
| 7,391,675 B2 | 6/2008 | Drew | |
| 7,680,640 B2 | 3/2010 | Camilleri | |

(Continued)

FOREIGN PATENT DOCUMENTS

| | | |
|---|---|---|
| EP | 0812429 A1 | 9/1996 |
| EP | 0812429 A1 | 12/1997 |

(Continued)

OTHER PUBLICATIONS

Whitaker, Ross., The Visualization Handbook, 6 Isosurface and Level-Sets., May 19, 2004, pp. 91-118.*

(Continued)

*Primary Examiner* — Yoshihisa Ishizuka (57) ABSTRACT

A method of determining a migration pathway of a subterranean fluid through a geological volume is provided. The starting object is located within the geological volume. The starting object defines an initial fluid boundary. Data points are distributed through the geological volume. The data points are associated with values of one or more geological attributes. The method includes the steps of: defining an expression which determines a change in position of the fluid boundary at the data points over an iteration based on the values of the one or more attributes; and applying the expression at the data points for successive iterations to evolve the fluid boundary over the successive iterations. The migration pathway of the subterranean fluid through the geological volume can then be determined from the evolution of the fluid boundary.

19 Claims, 5 Drawing Sheets

(56) References Cited

U.S. PATENT DOCUMENTS

| | | | |
|---|---|---|---|
| 7,859,943 | B2 | 12/2010 | Herwanger |
| 7,880,640 | B2 | 2/2011 | Lovell et al. |
| 8,392,163 | B2 | 3/2013 | Liu |
| 2003/0023383 | A1* | 1/2003 | Stark ................. G01V 1/28 702/14 |
| 2003/0112704 | A1 | 6/2003 | Goff et al. |
| 2005/0171700 | A1 | 8/2005 | Dean |
| 2006/0062084 | A1 | 3/2006 | Drew |
| 2007/0027666 | A1 | 2/2007 | Frankel |
| 2008/0033656 | A1 | 2/2008 | Herwanger |
| 2008/0154505 | A1 | 6/2008 | Kim et al. |
| 2008/0249414 | A1* | 10/2008 | Yang et al. ................. 600/445 |
| 2009/0299710 | A1 | 12/2009 | Liu |
| 2010/0121623 | A1 | 5/2010 | Yogeswaren |
| 2010/0161232 | A1 | 6/2010 | Chen et al. |
| 2010/0252270 | A1 | 10/2010 | Kim et al. |
| 2011/0046885 | A1* | 2/2011 | Bussat et al. ................. 702/14 |
| 2011/0063292 | A1 | 3/2011 | Holl et al. |
| 2011/0106507 | A1 | 5/2011 | Lepage |
| 2011/0205844 | A1 | 8/2011 | Maucec et al. |
| 2011/0295510 | A1* | 12/2011 | Gulati ............................ 702/16 |
| 2012/0029828 | A1* | 2/2012 | Pepper ................. G01V 1/301 702/16 |
| 2012/0044784 | A1* | 2/2012 | Pierle ............................ 367/38 |
| 2012/0139542 | A1 | 6/2012 | Montgomery et al. |
| 2013/0054147 | A1* | 2/2013 | Diller .................... G01V 1/288 702/14 |
| 2013/0090857 | A1 | 4/2013 | Imhof et al. |
| 2013/0158877 | A1 | 6/2013 | Bakke et al. |
| 2013/0238297 | A1 | 9/2013 | Lepage et al. |
| 2014/0214328 | A1 | 7/2014 | Hauk s et al. |

FOREIGN PATENT DOCUMENTS

| | | |
|---|---|---|
| GB | 2489369 A | 9/2012 |
| WO | 9837437 | 8/1998 |
| WO | 2008086352 | 7/2008 |
| WO | WO 2011077300 A2 * | 6/2011 |

OTHER PUBLICATIONS

International Search Report and Written Opinion issued in PCT/US2014/013255 dated Apr. 23, 2014, 9 pages.

Adalsteinsson et al., "A Fast Level Set Method for Propagating Interfaces," Journal of Computational Physics, 1995, vol. 118: pp. 269-277.

Berthelot et al., "Salt diapirs without well defined boundaries—a feasibility study of semi-automatic detection," Geophysical Prospecting, 2011, vol. 59: pp. 682-696.

Castagna et al., "Principles of AVO crossplotting," The Leading Edge, Apr. 1997: pp. 1-6.

Chopp, "Computing Minimal Surfaces via Level Set Curvature Flow," Journal of Computational Physics, 1993, vol. 106: p. 77-91.

Connolly et al., "Detecting Fault-Related Hydrocarbon Migration Pathways in Seismic Data: Implications for Fault-Seal, Pressure, and Charge Prediction," Gulf Coast Association of Geological Societies Transactions, 2008, vol. 58: pp. 191-203.

Ferguson et al., "Seismic analysis workflow for reservoir characterization in the vicinity of salt," first break, Oct. 2010, vol. 28: pp. 107-113.

Heggeland et al., "The chimney cube, an example of semi-automated detection of seismic objects by directive attributes and neural networks: Part II; interpretation," SEG Expanded Abstracts, 1999: pp. 1-4.

Iske et al., "Methematical Methods and Modelling in Hydrocarbon Exploration and Production," Springer: Heidelberg, 2005: pp. 47-116 and 247-265.

Kadlec et al., "Interactive Visualization and interpretation of Geologic Surfaces in 3-D Seismic Data," SEG Houston International Exposition and Annual Meeting, 2009: pp. 1147-1151.

Lomask et al., "Application of image segmentation to tracking 3D salt boundaries," Geophysics, Jul.-Aug. 2007, vol. 72(4): pp. P47-P56.

McInerney et al., "Deformable models in medical image analysis: a survey," Medical Image Analysis, 1996, vol. 1 (2): pp. 91-108.

Meldahl et al., "The chimney cube, an example of semi-automated detection of seismic objects by directive attributes and neural networks: Part 1; methodology," SEG Expanded Abstracts, 1999: pp. 1-4.

Nickel et al., "Non-rigid matching of migrated time-lapse seismic," SEG Expanded Abstracts, 1999: pp. 1-4.

Nickel et al., "Well Performance Analysis using 4D Seismic," SEG Houston International Exposition and Annual Meeting, 2009: pp. 3795-3799.

Nielsen et al., "Dynamic Tubular Grid: An Efficient Data Structure and Algorithms for High Resolution Level Sets," Journal of Scientific Computing, Mar. 2006, vol. 26(3): pp. 261-299.

Nyamapfumba et al., "Gas hydrate and free gas petroleum system in 3D seismic data, offshore Angola," Geophysics, Nov.-Dec. 2012, vol. 77(6): pp. 055-063.

Pedersen et al., "Automatic Fault Extraction using Artificial Ants," SEG International Exposition and 72nd Annual Meeting, Oct. 2002: pp. 1-4.

Randen et al., "Chapter 2: Atlas of 3D Seismic Attributes," Mathematical Methods and Modelling in Hydrocarbon Exploration and Production, Springer: Heidelberg, Ed.: Iske et al., 2005: pp. 23-46.

Sethian, "Level Set Methods and Fast Marching Methods," Cambridge University Press: Cambridge, 1999 Edition: pp. 60-74, 75-85 and 214-239.

Veeken et al., "AVO attribute analysis and seismic reservoir characterization," first break, Feb. 2006, vol. 1: pp. 41-52.

Xu et al., "On the Relationship between Parametric and Geometric Active Contours," IEEE Proceedings of the 34th Asilomar Conference on Signals, Systems and Computers, 2000: pp. 483-489.

Daly, Colin et al., "Characterisation and Modelling of Fractured Reservoirs: Static Model", Proceedings of he EP Conference of Mathematics of Oil Recovery, Aug. 30, 2004, P008072917, 8 pps.

European Supplementary Search Report for corresponding European Application Serial No. EP14743475, dated Jun. 6, 2016, 4 pps.

International Search Report and Written Opinion of PCT Application No. PCT/US2014/013256 dated May 8, 2014, 9 pages.

International Search Report and Written Opinion for corresponding PCT Application Serial No. PCT/182014/063477 dated Oct. 23, 2014, 7 pages.

Bhalerao et al., "Tensor Splats: Visualising Tensor Fields by Texture Mapped Volume Rendering", MICCAI 2003, LNCS 2879, pp. 294-302.

Caviedes et al., "User Interfaces to Interact with Tensor Fields. A State-of-the-Art Analysis", Similar NoE Tensor Workshop, Las Palmas, Nov. 2006.

Kindlmann et al., "Strategies for Direct Volume Rendering of Diffusion Tensor Fields", 2000 IEEE Transactions on Visualization and Computer Graphics, vol. 6, No. 2, 124-138.

Zheng et al., "Topological Lines in 3D Tensor Fields", IEEE Visualization 2004, 313-320.

Decision on Grant for corresponding Russian Application Serial No. 2015136466, dated Jan. 23, 2017, 15 pages.

Mexican Office Action for corresponding Mexican Application No. MX/a/2015/009562, dated Feb. 1, 2017, 7 pages.

Official Notification for corresponding Russian Application No. 2015136466, dated Oct. 18, 2016, 14 pages.

PetroMod Modules—Software Modules at a Glance, Schlumberger, 2012, 12-S-0398, 2 pages.

Search Report and Written Opinion of International Patent Application No. PCT/IB2014/063477, dated Oct. 23, 2014, 7 pages.

* cited by examiner

FLUID MIGRATION PATHWAY DETERMINATION

BACKGROUND

This disclosure relates in general to the determination of a migration pathway of a subterranean fluid through a geological volume.

The characterization of subsurface strata is important for identifying, accessing and managing reservoirs. The depths and orientations of such strata can be determined, for example, by seismic surveying. This is generally performed by imparting energy to the earth at one or more source locations, for example, by way of controlled explosion, mechanical input etc. Return energy is then measured at surface receiver locations at varying distances and azimuths from the source location. The travel time of energy from source to receiver, via reflections and refractions from interfaces of subsurface strata, indicates the depth and orientation of the strata.

U.S. Pat. No. 7,248,539 discloses a method for automated extraction of surface primitives from seismic data. For example, one embodiment of the method of U.S. Pat. No. 7,248,539 involves defining, typically with sub-sample precision, positions of seismic horizons through an extrema representation of a 3D seismic input volume; deriving coefficients that represent the shape of the seismic waveform in the vicinity of the extrema positions; sorting the extrema positions into groups that have similar waveform shapes by applying classification techniques with the coefficients as input attributes using unsupervised or supervised classification based on an underlying statistical class model; and extracting surface primitives as surface segments that are both spatially continuous along the extrema of the seismic volume and continuous in class index in the classification volume.

The characterisation of faults and fractures in reservoir formations can also be important. For example, fractures intersecting drilled wells may assist the flow of hydrocarbons from the reservoir into the wells and so increase production. Conversely, fractures may allow water to flow into the wells and so decrease production.

WO 2008/086352 describes a methodology for mapping fracture networks from seismic data using fracture enhancement attributes and fracture extraction methods. For example, borehole data can be used to determine modes of fracture, and in particular whether fracture clusters or networks would be detectable in surface seismic data. It can also provide information on fracture network inclination (i.e., average inclination of the fractures in a network relative to the horizontal) and strike azimuth (i.e., average direction of intersection of the fractures in a network relative to the horizontal).

Discontinuity extraction software (DES), for example as described in U.S. Pat. No. 7,203,342, may then be utilised to extract 3D volumes of fracture networks from surface seismic data. Extracted fracture networks may be parameterised in terms of the strength of their seismic response, and on their length, height and width.

The approach of U.S. Pat. No. 7,203,342 may also be used to characterise and extract other geological features, such as faults, from seismic data.

Non-rigid matching, for example as disclosed in U.S. Pat. No. 6,574,563, is a methodology for analyzing the changes between two seismic surveys (time-lapse seismic). The generation of a 3D displacement vector field with sub-sample/subvoxel precision shows the displacement of the reflectors from one survey to another. A local varying matching function using a smooth displacement field allows for the comparison of two different seismic surveys.

Reservoir production and/or injection may compromise the cap rock integrity and cause leakage of fluid from a reservoir to the overburden. Escaped reservoir fluid may have severe consequences such as pollution of ground water or the ocean and may also be the cause of an unexpected drop in the pressure of the reservoir and hence a drop in production.

To prevent leakage problems, a risk assessment can be performed, with the geomechanical properties of the reservoir seal and overburden being taken into account. In some cases, the risk assessment may have to consider that the reservoir seal has been breached. Being able to evaluate the reason for such a breach, and determine the pathway the reservoir fluid has undertaken may enable mitigation of the consequences of the breach and development of solutions to the problem.

The use of neural networks to combine different seismic attributes to extract (among other things) possible gas chimneys acting as vertical migration paths for hydrocarbons is discussed in Meldahl, P., Heggland, R., Bril, B., and de Groot, P., *The chimney cube, an example of semi-automated detection of seismic object by directive attributes and neural networks: part I; Methodology*, SEG EXPANDED ABSTRACTS 18, 931-934 (1999); and Heggland, R., Meldahl, P., Bril, B., and de Groot, P., *The chimney cube, an example of semi-automated detection of seismic object by directive attributes and neural networks: part II; Interpretation*, SEG EXPANDED ABSTRACTS 18, 935-940 (1999). Combining faults and gas chimneys to detect hydrocarbon migration pathways and predict vertical seal and charge risk is discussed in Connolly, D. L., Brouwer, F. and Walraven, D., *Detecting fault-related hydrocarbon migration pathways in seismic data: Implications for fault-seal, pressure and charge prediction*, GULF COAST ASSOCIATION OF GEOLOGICAL SOCIETIES TRANSACTIONS, Vol. 58: pp. 191-203 (2008). Using amplitude variation with offset (AVO) cubes and attributes derived from them to detect fault migration paths is discussed in Nyamapfumba, M. and McMechan, A., *Gas Hydrate and Free Gas Petroleum System in 3D Seismic Data, Offshore Angola*, GEOPHYSICS, Vol. 77(6): pp. O55-O63, 2012.

SUMMARY

In general terms, the present invention allows possible migration pathways of subterranean fluids to be determined based on the values of geological attributes, such as seismic attributes obtained from seismic surveying.

A first aspect of the present invention provides a method of determining a migration pathway of a subterranean fluid through a geological volume, wherein a starting object (e.g., a fluid reservoir) is located within the geological volume, the starting object defines an initial fluid boundary, data points are distributed through the geological volume, and the data points are associated with values of one or more geological attributes, the method including: defining an expression which determines a change in position of the fluid boundary at the data points over an iteration based on the values of the one or more attributes; and applying the expression at the data points for successive iterations to evolve the fluid boundary over the successive iterations, whereby the migration pathway of the subterranean fluid through the geological volume can be determined from the evolution of the fluid boundary. The method can be a computer-based method. For example, the defining and applying steps can be performed using one or more processors.

Advantageously, the method allows a user to efficiently obtain possible flow paths from or to a reservoir, helping to evaluate and mitigate risks. It can also permit a user to test different hypothesis by changing the input attributes, hence gaining a broader knowledge of the area in question.

A second aspect of the present invention provides a method of operating a well including the steps of: performing the method of the first aspect; and using the determined migration pathway to manage the operation of the well. For example, if the method suggests fluid leakage from a starting object such as a reservoir may be occurring along the determined migration pathway, steps may be taken to reduce the flow of fluid into the pathway or to block the pathway.

Further aspects of the present invention provide: a computer program comprising code which, when run on a computer, causes the computer to perform the method of the first aspect; a computer readable medium storing a computer program comprising code which, when run on a computer, causes the computer to perform the method of the first aspect; and a computer system programmed to perform the method of the first aspect. For example, a computer system can be provided for determining a migration pathway of a subterranean fluid through a geological volume, wherein a starting object (e.g., a fluid reservoir) is located within the geological volume, the starting object defines an initial object boundary, data points are distributed through the geological volume, and the data points are associated with values of one or more geological attributes, the system including: one or more processors configured to: define an expression which determines a change in position of the fluid boundary at the data points over an iteration based on the values of the one or more attributes; and apply the expression at the data points for successive iterations to evolve the fluid boundary over the successive iterations, whereby the migration pathway of the subterranean fluid through the geological volume can be determined from the evolution of the fluid boundary. The system thus corresponds to the method of the first aspect. The system may further include: a computer-readable medium or media operatively connected to the processors, the medium or media storing the location of the starting object within the geological volume, and storing the values of the one or more geological attributes at the data points. The system may further include: a display device for displaying the evolved fluid boundary as a geobody.

Further optional features of the invention will now be set out. These are applicable singly or in any combination with the any aspect of the invention.

The geological attributes can be seismic attributes and/or geometric attributes and/or numerical modelling derived attributes. Seismic attributes, however, are generally included in the geological attributes.

Seismic attributes are derived by performing mathematical operations on and/or filtering of seismic data. The seismic attributes are typically selected from the group consisting of: seismic amplitude, seismic higher order derivative, seismic phase, amplitude vs. offset data, chaos, variance, curvature, dip, dip deviation, fracture enhancement attributes, and velocity change attributes based on non-rigid matching. U.S. Pat. No. 7,248,539 describes some of these attributes in more detail. Seismic attributes are discussed more fully in T. Randen and L. Sønneland, "Atlas of 3D Seismic Attributes," chapter 2 of "Mathematical Methods and Modelling in Hydrocarbon Exploration and Production," eds. A. Iske and T. Randen, Springer, Berlin Heidelberg, 2005. Preferably each data point is associated with at least the respective seismic amplitude.

Geometric attributes can be derived from (manually or automatically) interpreted geometric primitives from a model repository. The geometric attributes are typically selected from the group consisting of: horizontal position, vertical position, proximity to faults, proximity to fractures, horizon surface dip, fault surface dip, proximity to oil-water-contacts, proximity to oil-gas-contacts, number of neighbouring extrema patches (which is an example of more general geometric attributes such as chaos and variance exhibited by local extrema patches), extrema patch area, extrema patch inline extent and extrema patch crossline extent. The geometric attributes can be created automatically or manually from e.g., seismic testing results, or other data such as surface elevation maps, satellite photographs, and gravity, magnetic and/or electromagnetic survey results.

The data points may be voxels.

The fluid may be a hydrocarbon fluid such as oil or gas, or another fluid such water or $CO_2$, or mixtures of such fluids.

The method may include the steps of: providing the location of a starting object within the geological volume; and providing the values of the one or more geological attributes at the data points. For example, the location of the starting object and the values of one or more geological attributes can be provided in the form of a computer-readable medium or media. The method may include an initial step of using the geological attributes to determine the location and initial fluid boundary of the starting object in the geological volume.

The starting object may be a source reservoir and the successive iterations may be forward in time such that the migration pathway is for the flow of the fluid from the source reservoir. Another option, however, is for the starting object to be a destination reservoir and the successive iterations to be backwards in time such that the migration pathway is for the flow of the fluid to the destination reservoir.

More generally, however, the starting object can be any potentially fluid-bearing or fluid-receiving object, such as a porous formation, a crack, or indeed a land or seabed surface of the geological volume, whether or not that formation actually bears fluid. The method may then be applied to determine whether there is a potential migration pathway from or to that formation. For example, the method can be applied to determine possible migration pathways between two porous formations having a set of faults therebetween. In another example, the method can be applied to determine whether there are possible subterranean migration pathways to the seabed. Such information can be useful, for example, in determining whether particular subterranean operations carry a risk of producing migration pathways that may lead to undesirable fluid movements (leading to e.g., reservoir pressure loss, aquifer contamination, or hydrocarbon seabed leakage).

The properties of the fluid, the values of the attributes at a given point and the temporal direction of the iterations can be used to define the expression at that point. For example, if the fluid is oil and the attributes at a given point indicate that that point is in a porous layer, then in a forward time frame the expression may favour expansion of the fluid boundary through the porous layer in a direction normal to the boundary. On the other hand, if the fluid is oil and the attributes at a given data point indicate that that point is in a substantially vertical fault, then in a forward time frame the expression may favour vertical upward movement of the fluid boundary along the fault.

If the values of a plurality of geological attributes can be provided at the data points, in the defining step, the values of the attributes may be scaled relative to each other. This scaling can help to make the effects of the attributes more directly comparable in the expression, i.e., so that undue weight is not put on certain attributes at the expense of other attributes.

The applying step may use the level set approach to apply the expression at the data points for the successive iterations.

The method may include the step of displaying the evolved fluid boundary as a geobody. This can facilitate overview by a user of the evolved fluid boundary.

The method may further include initial steps of: performing seismic testing (e.g., seismic surveying); and analysing results of the seismic testing to generate the data points distributed through the geological volume, each data point being associated with the values of one or more respective seismic attributes. For example, the analysis step may include any one or more of: extraction of surface primitives, fracture network mapping, and non-rigid matching. The method may further include an initial step of analysing the results of the seismic testing to generate geometric attributes. For example, the shapes and positions of surface horizons, faults and fractures can be extracted from the extrema, and these shapes and positions then allow geometric attributes such as dips, proximities, etc., to be calculated, Further optional features of the invention are set out below.

BRIEF DESCRIPTION OF THE DRAWINGS

Embodiments of the invention will now be described by way of example with reference to the accompanying drawings in which.

DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention, it being understood that various changes may be made in the function and arrangement of elements without departing from the scope of the invention.

Specific details are given in the following description to provide a thorough understanding of the embodiments. However, it will be understood by one of ordinary skill in the art that embodiments maybe practiced without these specific details. For example, well-known circuits, processes, algorithms, structures, and techniques may be shown without unnecessary detail in order to avoid obscuring the embodiments.

Also, it is noted that embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

As disclosed herein, the term "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The geological volume may be treated as being a collection of horizon surfaces (often referred to as seismic events or strata) that are defined at the positions of seismic data zero-crossings, maximum values or minimum values. Known methods by which such a sparse surface representation of a seismic data volume may be obtained are diverse, including manual interpretation, connected component labelling of extrema cubes and extrema classification.

Extrema detection, in particular, is a well known concept in signal and image processing, and there are many algorithms and techniques for performing such detection. For example, applying the extrema classification method discussed in U.S. Pat. No. 7,248,539, it is possible to obtain a sub-sample precision representation of all extrema within a seismic volume using volume reflection spectral decompositions (as discussed in WO 98/37437).

A particular advantage of using the approach of U.S. Pat. No. 7,248,539 for extracting connected horizon surfaces is that it can provide robust and versatile solutions even when faulted or chaotic regions are encountered.

More generally, extrema classification methods for horizon extraction can provide very good characterization of the local signal shape, as well as shape similarity throughout the area of interest.

Fault identification in seismic data can be performed e.g., by using swarm intelligence through the deployment of artificial ants ("Ant Tracking") into attribute volumes, as described in U.S. Pat. No. 7,203,342 and in Pedersen, S. I., T. Randen, L. Sønneland, and O. Steen, *Automatic Fault Extraction Using Artificial Ants*, 72ND SEG ANNUAL MEETING, Salt Lake City (2002).

Analysis, for example through calculation of seismic attributes, and information from well logs (as described in WO 2008/086352), can also reveal 3D sub-volumes containing fracture networks. In particular, fracture enhancement attributes enhance signals caused by fractures in seismic data.

Having identified sub-volumes of interest, fracture extraction can be performed on the fracture enhancement attributes, to obtain a geometrical representation of the fracture networks. Fracture extraction can proceed by identifying discontinuities in the fracture enhancement attribute. One example of a fracture network extraction procedure is again described in U.S. Pat. No. 7,203,342.

Another approach is non-rigid matching (NRM), as disclosed in U.S. Pat. No. 6,574,563. In a reservoir with production/injection, the seismic signal generally changes over time. Seismic surveys shot over the same area at intervals of time can provide time-lapse seismic surveys. Analyzing time-lapse seismic surveys can give valuable information about production, remaining hydrocarbons, evolution of injected fluid, etc. In particular, uplift or compaction can be observed by the displacement of seismic reflectors. Further discussion of NRM can be found in M. Nickel, and L. Sønneland, *Non-Rigid Matching of Migrated Time-Lapse Seismic*, 61ST EAGE CONFERENCE & EXHIBITION P065 (1999); and M. Nickel, and L. Sønneland, *Well Performance Analysis Using 4D Seismic*, 71ST EAGE CONFERENCE & EXHIBITION, Amsterdam P106 (2009).

In particular, by applying such techniques, it is possible to obtain a geological volume in which data points distributed throughout the volume are associated with respective seismic and geometrical attributes. Typical seismic attributes are seismic amplitudes and phases for the data points. These amplitudes and phases can be, for example, the starting values for the extrema classification method of U.S. Pat. No. 7,248,539. Typical geometric attributes are the horizontal and vertical positions of the respective data points, and the proximity to faults and fractures, as identified, for example, by the approach of U.S. Pat. No. 7,203,342.

A starting point for one method of the present invention may be the location of a fluid reservoir within a geological volume, the reservoir defining an initial fluid boundary. In an embodiment of the present invention, an expression is defined which determines a change in position of the fluid boundary, and the expression is applied for successive iterations to evolve the fluid boundary over the successive iterations. From this evolution, the migration pathway of the fluid through the geological volume may be determined.

There are various possible "deformable models" or "active contour" approaches that may be used to extract an object by deforming curve/curve deformation, and thereby evolve/evolving the object boundary. The two main approaches are parametric and geometric active contours (see, e.g., Chenyang Xu, Anthony Yezzi Jr., and Jerry L. Prince, *On the Relationship between Parametric and Geometric Active Contours*, PROCEEDINGS OF 34TH ASILOMAR CONFERENCE ON SIGNALS, SYSTEMS, AND COMPUTERS, pp. 483-489 (October 2000); and Tim McInerney and Demetri Terzopoulos, *Deformable Models in Medical Image Analysis: A Survey*, MEDICAL IMAGE ANALYSIS, Vol 1: pp. 91-108 (1996)).

In the parametric active contour approach, also called the Snake method, an initial, explicitly defined contour is deformed based on a set of forces applied to it. These forces can be determined from an image on which the object extraction takes place. The geometric active contour approach, also called the level sets approach, is an implicit method, such that there is no explicit moving contour (see SETHIAN J. A. *LEVEL SET METHODS AND FAST MARCHING METHODS*, CAMBRIDGE University Press, 1996)). A level set function is deformed based on a set of forces applied to it, where the forces can be determined from an image on which the object extraction takes place. The resulting contour is obtained by taking the zero level of the function (where the function is equal to zero)—hence the name "level sets."

In an embodiment of the present invention, the level set approach, which is now describe in more detail, may be used. The level set algorithm is based on solving the differential equation given by:

$$\varphi_t + F_n(x)\|\nabla\varphi\| + F_e(x)\cdot\nabla\varphi - F_c(x)\kappa\|\nabla\varphi\| = 0 \quad (1)$$

where $\varphi$ is the level set function.

The level set function is defined in every voxel (data point) of the image, and is an implicit formulation of the movement of an object boundary submitted to forces. The object (i.e., fluid) boundary is given by:

$$\Gamma(t) = \{x = (x_1, x_2, x_3) | \varphi(x,t) = 0\} \quad (2)$$

and we assume that $\varphi > 0$ inside the object and $\varphi < 0$ outside the object. As the function $\varphi$ is updated in each voxel, the object boundary evolves.

The vector x corresponds to the voxel position and in the case of a seismic cube $$x = (x_{inline}, x_{crossline}, x_{vertical}).$$

Figure 1:
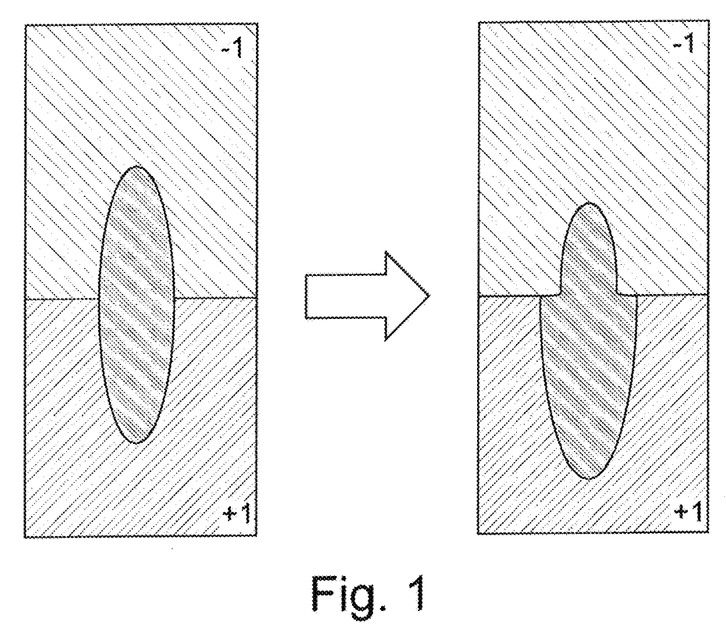
FIG. 1 is a schematic illustration of the normal force $F_n(x)$ acting on an object (dark ellipse in left hand image) shrinking it when the normal force is negative (−1) and expanding it when the normal force is positive (+1)

The level set equation given by Eq. (1) can be divided in three distinct terms, excluding the time derivative $\varphi_t$. The first term, called normal force, describes the motion in a direction normal to the object boundary as shown in FIG. 1. $F_n(x)$ gives the magnitude of this force for each voxel.

Figure 2:
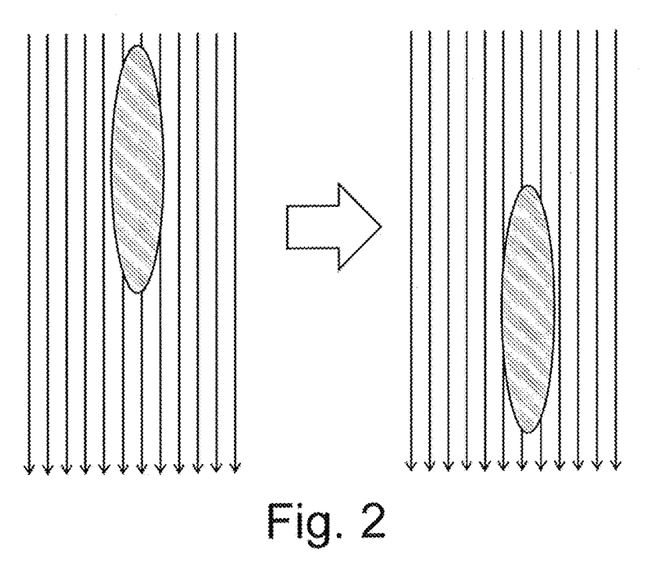
FIG. 2 is a schematic illustration of the directional force $F_e$ in the form of a uniform vector field acting on an object (dark ellipse in left hand image)
Figure 3:
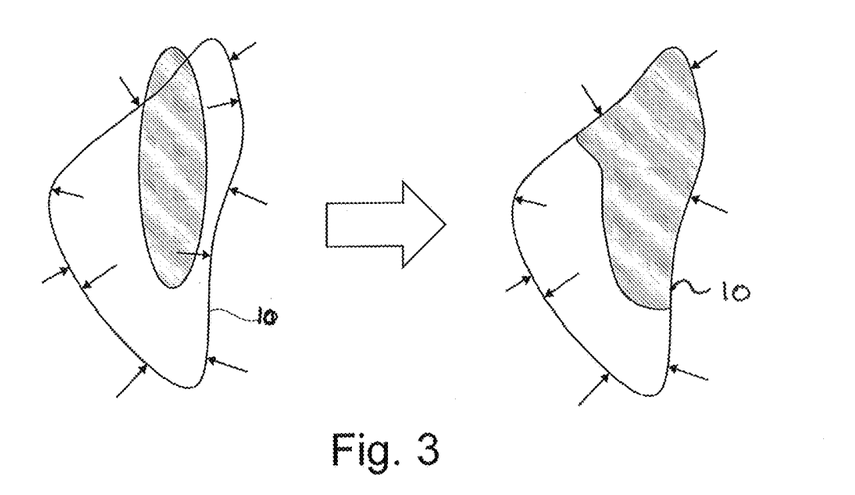
FIG. 3 is a schematic illustration of the directional force $F_e$ in the form of forces pointing towards a contour 10 and acting on an object (dark ellipse in left hand image), the forces reducing with distance from the contour 10.

The second term, called directional force, describes the motion in a direction given by the vector $F_e(x)$, where $F_e = (F_{inline}, F_{crossline}, F_{vertical})$ for the case of a seismic cube. Examples can be seen in FIGS. 2 and 3.

Figure 4:
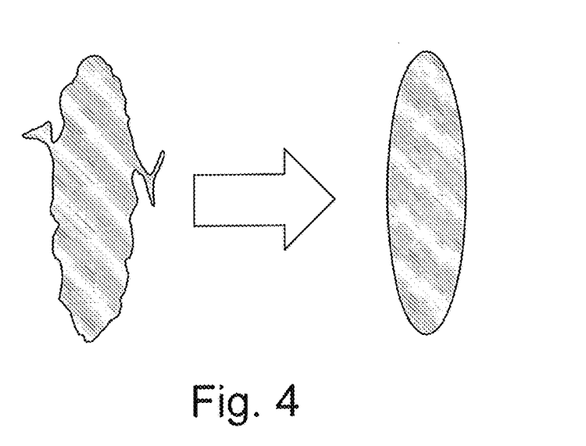
FIG. 4 is a schematic illustration of the curvature force $F_c(x)$ acting on an object.

The third term, called the curvature force, describes the motion such that the boundary mean curvature $\kappa$ is minimized and the boundary appears smooth. $F_c(x)$ governs the strength of this force. The boundary mean curvature is given by $$\kappa = \nabla \cdot \frac{\nabla \varphi}{|\nabla \varphi|} = \frac{\varphi_1^2(\varphi_{22}+\varphi_{33})+\varphi_2^2(\varphi_{11}+\varphi_{33})+\varphi_3^2(\varphi_{11}+\varphi_{22})}{(\varphi_1^2+\varphi_2^2+\varphi_3^2)^{3/2}} - \quad (3)$$

$$\frac{2(\varphi_{12}\varphi_1\varphi_2+\varphi_{23}\varphi_2\varphi_3+\varphi_{13}\varphi_1\varphi_3)}{(\varphi_1^2+\varphi_2^2+\varphi_3^2)^{3/2}}$$

where $\varphi_i$, i=(1,2,3) denotes the partial derivative of $\varphi$ with respect to $x_i$. FIG. 4 shows an example of this force applied to an object.

The level set algorithm can be implemented using an iterative numerical scheme given by $$\varphi^{n+1} = \varphi^n - \Delta t(F_n\|\nabla\varphi^n\| + F_e \cdot \nabla\varphi^n - F_c\kappa^n\|\nabla\varphi^n\|) \quad (4)$$

The level set function $\varphi$ can thus be updated until the force terms reach an equilibrium position, or a specified number of iterations is reached. The initial function $\varphi^0$ at the starting iteration corresponds to an object at a known location within a geological volume and having a defined object boundary.

Both the spatial and time derivatives can be calculated using finite differences. The order of the finite difference scheme can be selected based on an evaluation of the need of precision versus the computational effort. First order schemes for both spatial and time derivatives can be sufficiently precise and are computationally efficient.

In order to ensure the stability of this explicit time scheme, the CFL (Courant-Friedrich-Levy) condition may be used, which states that the boundary of the object can move no more than one voxel per iteration. This translates mathematically to $$\Delta t \leq \frac{\alpha}{\max_{x\in\Omega}\left[\left\|\frac{F_n}{\|\nabla\varphi\|}\sum_{i=1}^{3}\frac{|\varphi_i|}{\Delta x_i}\right\| + \sum_{i=1}^{3}\frac{|F_{e,i}|}{\Delta x_i} + \sum_{i=1}^{3}\frac{|2F_c|}{\Delta x_i^2}\right]} \quad (5)$$

where $\Omega$ represents all possible voxels and $\alpha$ is the CFL factor and thus $0<\alpha<1$.

The level set algorithm can be time-consuming, particularly on large data sets. Thus in order to improve efficiency, a narrow band implementation can be adopted (see, e.g., Sethian, J. A. *Level Set Methods and Fast Marching Methods*, CAMBRIDGE UNIVERSITY PRESS (1996)) whereby the calculations take place only in a band around the current boundary. The band is updated every iteration. In addition, to improve the computational complexity and the storage requirements a Dynamic Tubular Grid data structure can be implemented (see Nielsen, M. B., and K. Museth. *Dynamic Tubular Grid: An Efficient Data Structure and Algorithms for High Resolution Level sets*, JOURNAL OF SCIENTIFIC COMPUTING 26, no. 3, 261-299 (2006)).

Additional features can be implemented with the level set approach described above. For example, objects such as horizon interpretations, point sets or surfaces can be defined as barriers, through which the object cannot evolve. A "stopping criterion" can be introduced by specifying a number of iterations after which a voxel is considered fixed. When voxels in a certain region no longer change, i.e., the object boundary no longer moves, the voxels are taken out of the narrow band. This significantly increases the efficiency of the computations, as the number of calculations is reduced. In addition, it is possible to visualize the regions where the boundary has stopped in the output, which can be useful as a quality indicator of the result. However, care must be taken when using the stopping criterion, as there is a risk of voxels being taken out of the narrow band before they reach an equilibrium position. This can happen when one voxel has a force value that is significantly larger than all the others, as the CFL time step is a global value calculated using the maximum force value taken over the whole domain.

In an embodiment of the present invention, a leakage path from a reservoir can be extracted using the level set approach and by specifying forces based on seismic attributes.

There are various possibilities for the different pathways a fluid can follow in the subsurface. The fluid can pass through an impermeable layer because of fracturing caused by stress generated by pore-pressure build-up in underlying porous layers. The fluid can also migrate laterally in a porous layer. The fluid can also migrate through open faults or fractures. When such possibilities are combined, the resulting path can be complex. Each of these possibilities is now considered in turn.

If the stress in the cap rock seal above a reservoir increase, there is a risk of the cap rock being compromised. In an embodiment of the present invention, the velocity change attribute determined using non-rigid matching can be used to identify likely cap rock fracturing. More particularly, an increased stress in the cap rock causes the velocity in the cap rock to increase. In contrast, within a porous layer newly invaded fluids cause the pore pressure to increase, decreasing the velocity in the layer. Thus a combination of velocity increase in the cap rock and a velocity decrease in a porous layer above the cap rock can be an indicator of cap rock fracturing.

Turning to lateral fluid migration in a porous layer, such layers may be identified in various ways. For example, in an embodiment of the present invention, where there are layers of porous sand and non-porous shale, in order to estimate where the sand layers exist, an assumption may be made that the acoustic impedance of shale is higher than that of sand. In an embodiment of the present invention, a further assumption may be made that all negative reflectors are the top of a porous layer. Such an approach tends to overestimate the number of porous layers, but over-estimation may be preferably to under-estimation.

Porous layers can also be identified using methods, such as amplitude-versus-offset (AVO) analysis, interpreted surfaces or well logs (see for example, overviews of AVO analysis in Veeken, P and Rauch-Davies, M., *AVO Attribute Analysis And Seismic Reservoir Characterization*, FIRST BREAK, Volume 24, pp. 41-52, (February 2006) and Castagna, J. P. and Swan, H. W., *Principles of AVO Crossplotting*, THE LEADING EDGE, Volume 4, pp 337-344 (April, 1997).

In an embodiment of the present invention, the identification of fluid flow in porous layers can be improved by combining a porous layer with a decreased NRM velocity (caused by fluid flow in the porous layer leading to an increase in pore pressure).

As to open faults or fractures, in an embodiment of the present invention, these can be identified using the Ant Tracking approach. In general, Ant Tracking identifies all fault and fracture discontinuities, regardless of whether they are open or closed. In some embodiments of the present invention, additional information e.g., derived from palinspastic reconstruction (which reconstructs faults to their position before faulting, hence giving useful information on the geomechanical properties during time) or general stress field knowledge can help to separate between closed and open discontinuities.

In an embodiment of the present invention, the attributes described above can then be used as inputs to the level set approach, through $F_n(x)$ and $F_e(x)$.

In embodiments of the present invention, the attributes may be combined into normal and directional forces, or possibly used as additional constraints. The level set approach takes into account the value of the forces compared to each other. Therefore, the values of the different attributes are comparable. If this is not done appropriately, the risk is that too much emphasis is put on a certain attribute compared to the others. This would then give an unwanted behaviour of the corresponding level set forces.

As an example, seismic data can have very different amplitude values from one survey to another (one survey could have value ranges from −0.02 to 0.02 while another could have value ranges from −40 000 to +40 000), while fault attributes derived from AntTracking are in the range [−1, 1]. Thus, in embodiments of the present invention, the value ranges for the different attributes used are examined, taking into account the value ranges that are of interest for the specific case (for instance, for a given attribute having values between −10 and 10, interest might be focused on the values ranging from 0 to −2), and then the value ranges are scaled such that they are comparable.

Having scaled the attributes, in embodiments of the present invention, the following assumptions are made: the seismic data has been depth converted and the escaping reservoir fluid is lighter than the formation fluid in the overlying layers. Under these assumptions, the reservoir fluid is expected to migrate through a gravitational-driven flow.

Thus, in an embodiment of the present invention, any "upwards flow" (e.g., in a fault or in a break in an impermeable layer) can be simulated using the vertical component of the directional force (see FIG. 2) in the level set formulation (Eq. 1). However, using only the vertical component is generally not suitable as the object is then incapable of growing diagonally upwards, as would be expected in a fault. As such, in an embodiment of the present invention, a normal force may be used, such that $F_n = \beta |F_{e,vert}|$ with $\beta > 0$. In this way, in embodiments of the present invention, global growth can be in the direction specified, but with an added lateral component.

Figure 5:
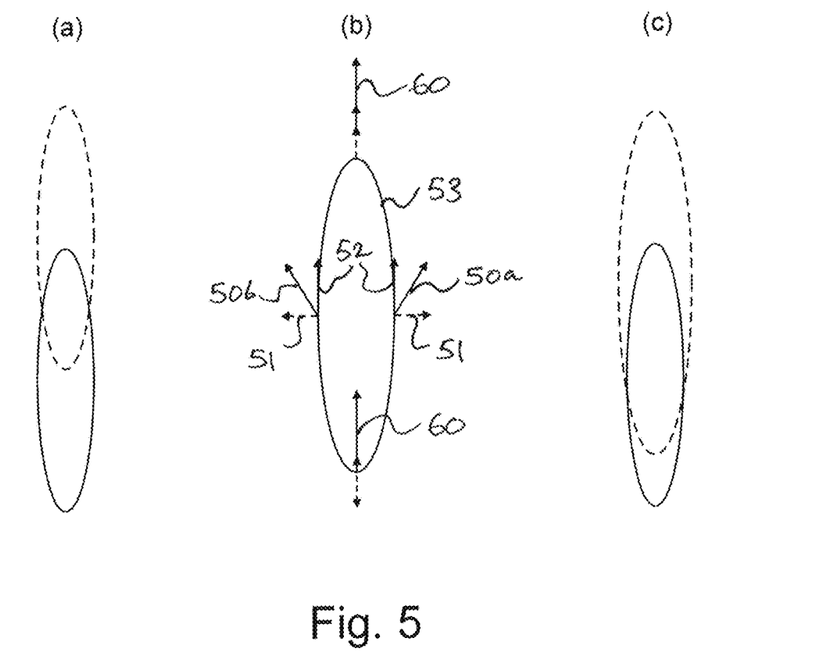
FIG. 5 illustrates vertically upwards flow, the starting object being a solid outline ellipse and the resulting object being a dashed outline ellipse, with (a) showing a pure vertical flow, (b) showing resultant forces (grey arrows) applied when combining vertical forces (solid arrows) and normal forces (dashed arrows), and (c) showing the result of the combined forces.

FIGS. 5(a) to (c) illustrate this type of force. In FIG. 5(a), only a vertical force is applied, hence the initial object (denoted by the solid boundary) is shifted vertically. FIG. 5(b) shows the components of the normal force 52 and the vertical force 51 applied on the initial object 53 (with in this case $\beta \leq 1$). The resultant force 50a and 50b always has an upwards-pointing vertical component 60 (due to $\beta \leq 1$). When these forces are applied, as shown in FIG. 5(c), the vertical shift is smaller than in (a), but the object increases in size due to the added normal force.

The above description of vertical flow, in accordance with embodiments of the present invention, is relevant both for fault attributes and for the NRM attribute related to breaking through a reservoir seal, although the details of the force description may differ. For growth in a porous layer, methods in accordance with embodiments of the present invention, may generally use only normal forces, unless the layer being analysed is significantly tilted.

In some cases it might be necessary to use additional constraints as a means of directing the flow in a certain direction. For example, in some embodiments of the present invention, it may be desirable to stop the flow at a certain horizon, or limit the fluid flow to only a zone of interest within the reservoir/overburden.

By way of example, embodiments of the present invention have been applied to the West Loppa seismic survey.

Figure 6:
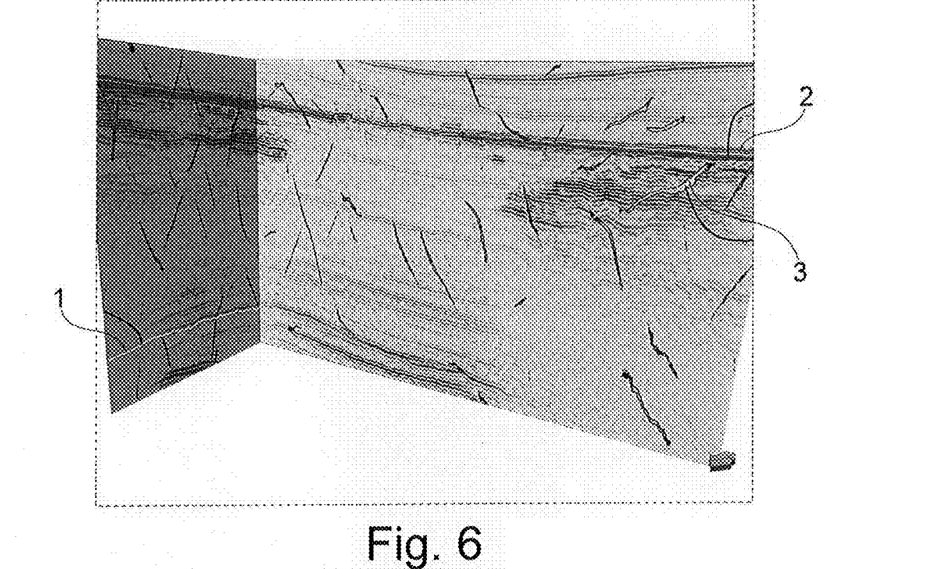
FIG. 6 shows a seismic cube from West Loppa.

FIG. 6 shows a seismic cube from the seismic survey. A first formation of interest 1 is a possible source rock. A second formation of interest 2 is a possible reservoir. Faults and fractures 3 between these formations have been identified by AntTracking.

Figure 7:
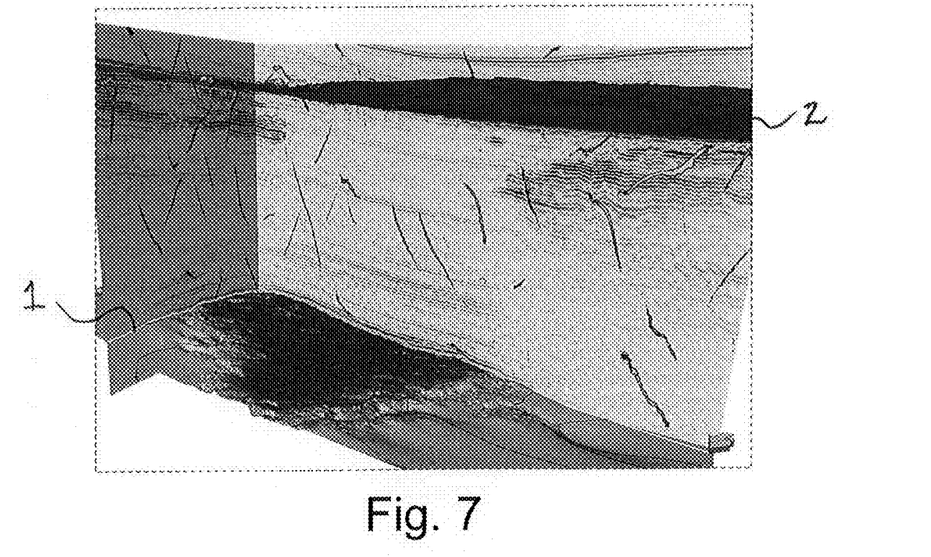
FIG. 7 shows the seismic cube of FIG. 6 with the extracted horizons corresponding to first and second formations overlain with seismic amplitudes.
Figure 8:
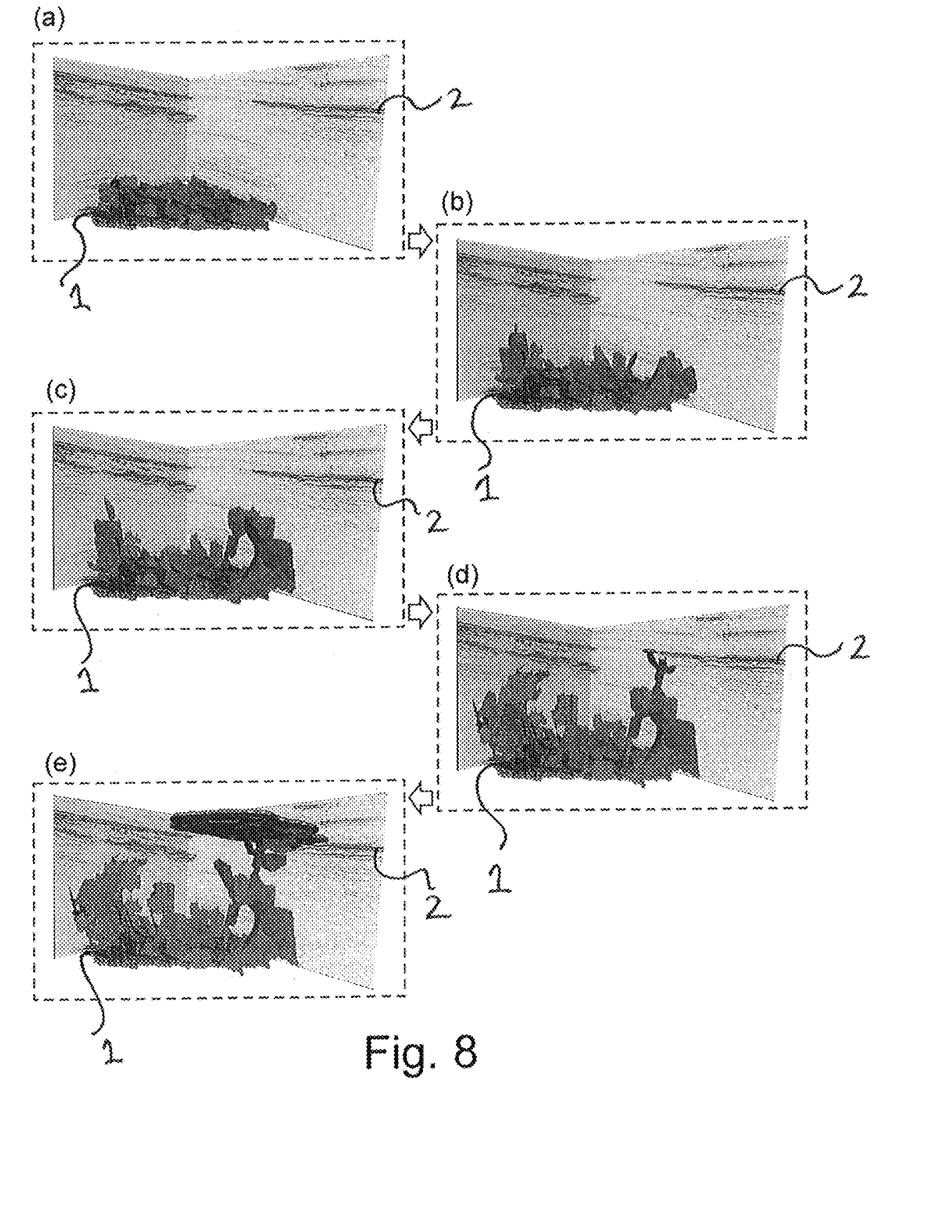
FIGS. 8(a) to (e) show the evolution of a fluid boundary with time overlain on the seismic cube from West Loppa.

FIG. 7 shows the seismic cube of FIG. 6 with the extracted horizons corresponding to the first formation of interest 1 and th2 second formation of interest 2 overlain with seismic amplitudes, in accordance with an embodiment of the present invention. The seismic amplitudes suggest that both formations contain hydrocarbon, and a question is whether a migration pathway exists whereby the hydrocarbon from the first formation can flow into the second formation, i.e., whether the first formation can be a source formation to the second formation.

The starting object for the level set approach in accordance with an embodiment of the present invention is the apparent hydrocarbon-bearing zone in the first formation 1, the object (i.e., fluid) boundary being determined from the upper surface of the formation. In accordance with an embodiment of the present invention, seismic amplitude and AntTracking value ranges were appropriately scaled. In accordance with an embodiment of the present invention, flow in the faults and fractures 3 between the first 1 and second 2 formations was modelled in the level set equation by a vertical force modified by a normal force, as discussed above in relation to FIGS. 5(b) and (c). Flow in the first and second formations was modelled by normal forces.

FIGS. 8(a) to (e) show the evolution of the fluid boundary with time resulting from the use of the level set approach, in accordance with an embodiment of the present invention. Above the first formation 1, there are several possible leakage pathways from the first formation. However, based on the results of FIG. 8, the most interesting is a pathway at the right hand side, which appears to show that the first formation can indeed be a source formation to the second formation 2.

Embodiments of the present invention thus facilitate a user to obtain possible fluid migration pathways. Although described above in relation to forward iterations (i.e., for flow from a source to a destination), in some embodiments of the present invention, backward iterations can also be used e.g., in order to explore possible sources for a reservoir. As such, embodiments of the present invention provide for identifying probable locations of hydrocarbons in a formation and mapping of deposits to other deposit locations. For example, potential locations of hydrocarbon deposits may be confirmed/identified by determining the likelihood of a flow from a known hydrocarbon deposit to the proposed deposit location. In embodiments of the present invention, a determined fluid pathway for flow of hydrocarbons from or to a location of a hydrocarbon deposit/reservoir may be displayed to a user and/or input into a seismic/reservoir model to understand a probable location of hydrocarbon deposits and/or properties of the reservoir.

All references referred to above are hereby incorporated by reference for all purposes.

The invention claimed is:

1. A method of determining a migration pathway of a subterranean fluid through a geological volume, the method comprising:
   placing sources at one or more source locations;
   placing surface receivers at varying distances and azimuths from the one or more source locations;

carrying out seismic testing by imparting energy to the earth from the sources at the one or more source locations and measuring return energy to the receivers;

analyzing seismic testing results to generate data points distributed through a geological volume, each data point being associated with values of one or more geological attributes derived from the results of the seismic testing and at least some of which are indicative of possibility for fluid migration at the data point;

identifying a starting object within the geological volume, wherein the starting object defines an initial position of a fluid boundary at a plurality of the data points;

defining an expression which determines a change in position of the fluid boundary at the data points from forces acting on the object at the fluid boundary, wherein the forces are determined from the values of the one or more geological attributes associated with the data points and the forces are (i) force normal to the object boundary, (ii) directional force on the object, and (iii) curvature force which minimizes curvature of the object boundary; and applying the expression at the data points for successive iterations to evolve the position of the fluid boundary over the successive iterations, whereby the migration pathway of the subterranean fluid through the geological volume can be determined from the evolution of the position of the fluid boundary.

2. The method of claim 1, wherein the starting object is a source reservoir and the successive iterations are forward in time such that the migration pathway provides for a flow of the fluid from the source reservoir.

3. The method of claim 1, wherein the starting object is a destination reservoir and the successive iterations are backwards in time such that the migration pathway provides a flow of the fluid to the destination reservoir.

4. The method of claim 1, wherein the values of a plurality of geological attributes are provided at the data points, and wherein, in the defining step, the values of the attributes are scaled relative to each other.

5. The method of claim 1, wherein the applying step uses a level set approach to apply the expression at the data points for the successive iterations.

6. The method of claim 1, wherein the geological attributes include seismic attributes selected from a group consisting of: seismic amplitude, seismic higher order derivative, seismic phase, amplitude vs. offset data, chaos, variance, curvature, dip, dip deviation, fracture enhancement attributes, and velocity change attributes based on non-rigid matching.

7. The method of claim 1, comprising:
displaying the evolved fluid boundary as a geobody.

8. A method of operating a well comprising:
performing the method according to claim 1; and
managing the operation of the well using the determined migration pathway.

9. The method of claim 8, wherein managing the operation of the well comprises at least one of reducing fluid flow into the migration pathway or blocking fluid flow into the migration pathway.

10. A method of determining a location of a hydrocarbon deposit, including the steps of:
performing the method according to claim 1; and
determining the location of the hydrocarbon deposit using the determined migration pathway.

11. The method of claim 10, wherein the step of determining the location of the hydrocarbon deposit comprises using the determined migration pathway and seismic data to determine the location of the hydrocarbon deposit.

12. The method of claim 1 wherein at least some of the geological attributes associated with the data points are indicative of porosity, rock fault or rock fracture.

13. A method of managing hydrocarbon extraction, comprising:

carrying out seismic testing by imparting energy to the earth from sources at one or more source locations and measuring return energy to receivers at surface receiver locations at varying distances and azimuths from the one or more source locations;

analyzing results of the seismic testing to generate data points distributed through a geological volume, each data point being associated with values of one or more geological attributes derived from the results of the seismic testing and at least some of which are indicative of possibility for fluid migration at the data point;

determining a starting object which is located within the geological volume and which defines an initial position of a fluid boundary at a plurality of the data points;

defining an expression which determines a change in position of the fluid boundary at the data points from forces acting on the object at the fluid boundary, where the forces are determined from the values of the one or more geological attributes associated with the data points and the forces are (i) force normal to the object boundary, (ii) directional force on the object, and (iii) curvature force which minimizes curvature of the object boundary;

applying the expression at the data points for successive iterations to evolve the position of the fluid boundary over the successive iterations, whereby the migration pathway of the subterranean fluid through the geological volume can be determined from the evolution of the position of the fluid boundary; and modifying operation of one or more hydrocarbon extraction wells so as to inhibit flow along the predicted migration pathway or so as to access hydrocarbon which has already flowed along the predicted pathway.

14. The method of claim 13 wherein at least some of the geological attributes associated with the data points are indicative of porosity, rock fault or rock fracture.

15. The method of claim 13, wherein the applying step uses a level set approach to apply the expression at the data points for the successive iterations.

16. The method of claim 13, wherein the geological attributes include seismic attributes selected from a group consisting of: seismic amplitude, seismic higher order derivative, seismic phase, amplitude vs. offset data, chaos, variance, curvature, dip, dip deviation, fracture enhancement attributes, and velocity change attributes based on non-rigid matching.

17. The method of claim 13, wherein the starting object is a source reservoir and the successive iterations are forward in time such that the migration pathway provides for a flow of the fluid from the source reservoir.

18. The method of claim 13, wherein the starting object is a destination reservoir and the successive iterations are backwards in time such that the migration pathway provides a flow of the fluid to the destination reservoir.

19. The method of claim 13, wherein the values of a plurality of geological attributes are provided at the data points, and wherein, in the defining step, the values of the attributes are scaled relative to each other.

* * * * *